United States Patent [19]

Enderle

[11] Patent Number: 4,461,517

[45] Date of Patent: Jul. 24, 1984

[54] THROTTLE FOR GAS BEARINGS

[75] Inventor: Eckhard Enderle, Aalen-Wasseralfingen, Fed. Rep. of Germany

[73] Assignee: Carl-Zeiss-Stiftung, Oberkochen, Fed. Rep. of Germany

[21] Appl. No.: 438,507

[22] Filed: Nov. 2, 1982

[30] Foreign Application Priority Data

Nov. 11, 1981 [DE] Fed. Rep. of Germany ....... 3144788

[51] Int. Cl.³ ..................... F16C 32/06; F16K 31/126
[52] U.S. Cl. ............................... 308/5 R; 137/505.25; 138/46; 384/99
[58] Field of Search ................ 308/5 R; 384/99, 100; 138/46, 45, 44; 137/503, 510, 505.25; 251/121, 122

[56] References Cited

U.S. PATENT DOCUMENTS 2,856,132 10/1958 Chace ...................... 137/505.25 X
2,940,462  6/1960 Johanson ....................... 137/503 X
3,717,392  2/1973 Ennis .................................. 308/5 R
4,047,695  9/1973 Cleveland et al. ............... 138/46 X Primary Examiner—Stuart S. Levy
Assistant Examiner—David Werner
Attorney, Agent, or Firm—Hopgood, Calimafde, Kalil, Blaustein & Judlowe

[57] ABSTRACT

The invention relates to an ancillary throttle (2) for gas bearings (1) which are exposed to such varying operational load conditions (F) as to change the magnitude of bearing clearance (S). The throttle (2) stabilizes the bearing clearance (S) by using the load-dependent internal pressure of the bearing (1) to regulate the cross section of the throttle.

Inlet (13) and outlet (14) of the ancillary throttle are separated by a membrane (6) which displaceably carries an insert (9) having a slightly conical bore, and the insert (9) is adjustably preloaded by a spring (10).

A pin (8), also conical, extends through the bore and coacts with the bore to establish a throttle path of variable cross section. The conical pin (8) is axially displaceable in order to adjust the flow of gas.

8 Claims, 2 Drawing Figures

THROTTLE FOR GAS BEARINGS

BACKGROUND OF THE INVENTION

The present invention relates to a throttle for maintaining constant clearance in a gas bearing by pressure-dependent control of the throttle cross section.

As a rule, gas bearings have a throttle insert of adjustably fixed cross section by which gas flow can be adjusted, to thereby adjust the bearing pressure which determines the size of the bearing clearance. But the magnitude of bearing clearance is also dependent on the load acting on the bearing. Under varying loads the magnitude of the bearing clearance therefore changes continuously, and this is undersirable in certain cases of use, as for example when the bearings are used to guide movable parts in precision measuring machines or in machine tools.

Plain bearings are already known which have throttle inserts of adjustable cross section, the load-dependent bearing pressure effecting a change in the throttle cross section. For example, West German OS No. 2,538,226 and OS No. 2,548,385 disclose throttle inserts of elastomeric material, containing capillary bore passages for the supply of lubricant, in those cases oil for a radial bearing. These bore passages widen with the increase in bearing pressure which occurs upon heavier loading.

West German OS No. 1,943,833 describes an axial-plain bearing having a ring which is movable in response to bearing pressure and against spring force to control the cross section of a plurality of supply passages for the required lubricant.

These known throttle inserts are component parts of the specific bearing in which they are used, and their shape and construction are adapted and optimized to such bearing.

West German OS No. 2,514,370 discloses a device for adjusting the bearing clearance of gas bearings in which the temperature of the operating gas changes under control by the bearing pressure, to thereby effect a widening of contraction of the bearing nozzles. Such a control is relatively expensive and requires the use of special materials especially selected on the basis of coefficients of thermal expansion.

BRIEF STATEMENT OF THE INVENTION

The object of the present invention is to provide a throttle element of the aforementioned type which can be used universally, i.e., regardless of the structural form of the gas bearing.

The invention achieves this object by providing a throttle unit, separate and apart from the gas bearing with which it is to be used. The outlet side of the throttle unit delivers gas flow to the bearing to maintain constant bearing clearance, despite load variations on the bearing. The throttle unit employs the difference between inlet-side and outlet-side gas pressures to regulate the cross section of the throttle path in such manner that the cross section increases when the pressure difference decreases.

The throttle of the invention can be installed directly in the supply line of a gas bearing of any desired construction and increases the stiffness of the bearing very considerably. The sole prerequisite in use of the inventive throttle is that the gas bearing shall not contain any other throttle points of cross section comparable to or smaller than that of the inventive throttle. The prerequisite can, however, be satisfied in practically all cases, inter alia, by removing the throttles of gas bearings having built-in throttles.

Another advantage of the invention is that, through use of only one ancillary throttle, bearing clearances may be maintained in a plurality of gas bearings, combined in a group.

Stabilized bearing clearance is of particular importance in multiple-coordinate measuring machines whose carriages are displaceable along the measurement axes and slide on gas bearings. When, for example, the carriage which is displaceable on the cross slide of a portal-type measuring machine moves along the cross slide, the load on gas bearings in the base of the portal changes considerably, leading, in the case of uncontrolled bearings, to a tilting of the portal about its axis of displacement. This tilting leads to an error in the measurement since the position of the portal is directly involved in the precision of machine measurement.

With one throttle of the invention for each portal base, the bearing groups of each portal base can be so stabilized that such measurement error is no longer significant.

DETAILED DESCRIPTION

Figure 1:
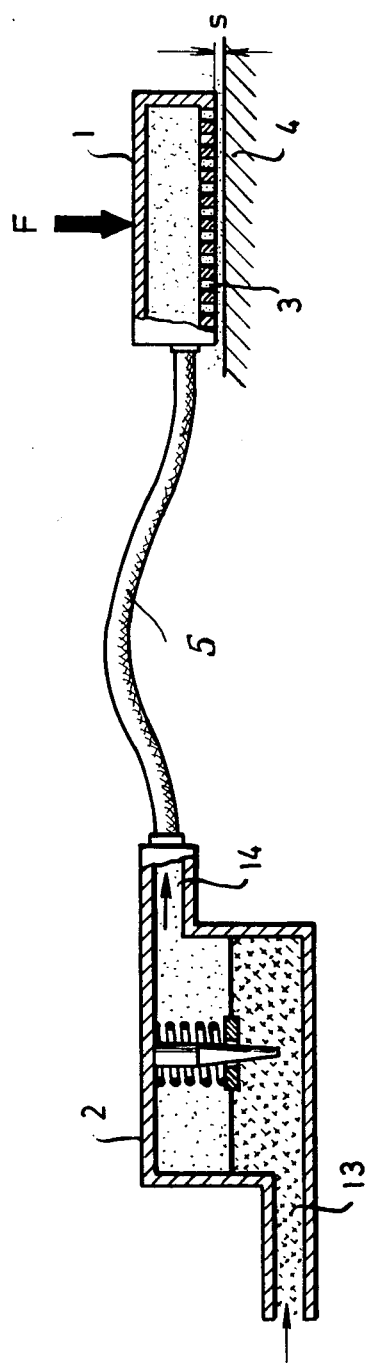
Figure 2:
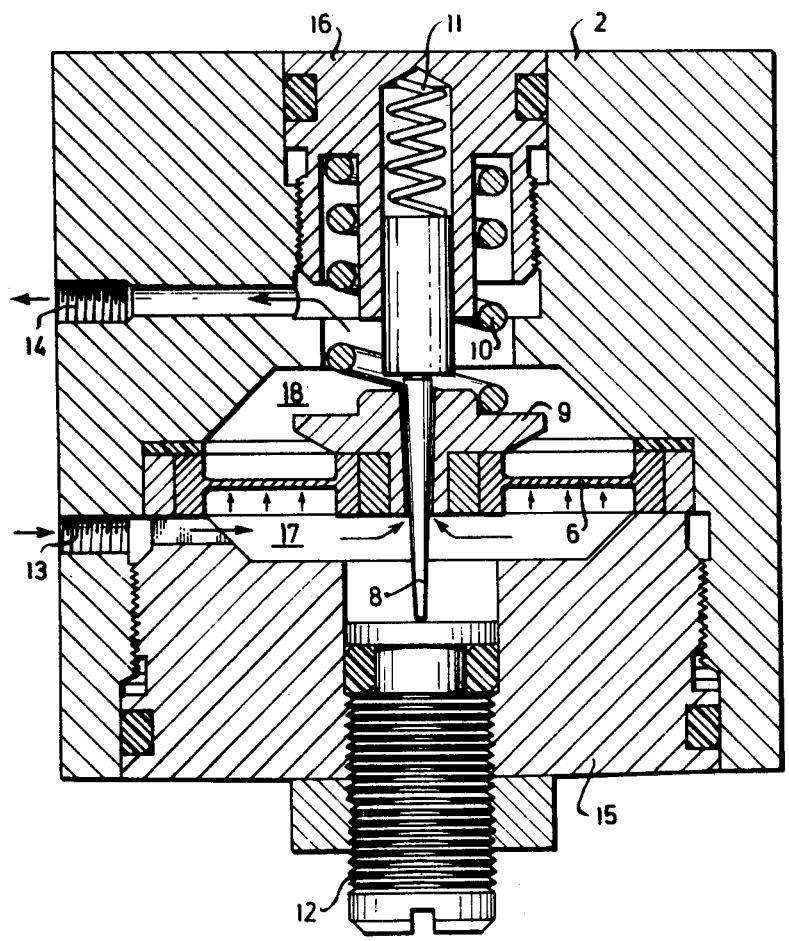

An illustrative embodiment of the invention will be described in detail in conjunction with the accompanying drawings, in which:

FIG. 1 is a simplified diagram of an air bearing with an ancillary throttle; and FIG. 2 is an enlarged sectional view of the throttle component of FIG. 1.

In FIG. 1, a gas bearing (axial plain bearing) 1 is slidable over a base 4 on air flowing out of bore passages 3. The distance between base 4 and bearing 1 is the bearing clearance S, which is a function of the rate of air flow and of the load F.

A throttle valve 2 of the invention is connected in the supply line 5 to gas bearing 1. Throttle 2 consists of a separate closed housing have inlet and outlet port connections 13 and 14, respectively, for flow of the operating gas.

As shown in the detail drawing (FIG. 2), the body of throttle 2 contains two chambers 17 and 18 which are separated by a diaphragm or membrane 6, the rim of which is secured by an air-tight insert 15. Membrane 6 carries a conically bored annular insert 9 which is movable, against the action of a first spring 10, in response to the pressure difference between chambers 17 and 18. A throttle pin 8 extends through the bore of insert 9; pin 8 is also conical and forms with the conical bore a throttle path of variable cross section.

The conical pin 8 is axially displaceable via a sealed adjustment screw 12, against the action of a second spring 11, and both springs 10 and 11 are adjustably referenced to a second air-tight insert 16. The throttle cross section can thus be adapted to the requirements of the gas bearing 1, without the control properties of throttle 2 being affected thereby.

Since throttle pin 8 is not fixed radially, it can center itself within the bore of insert 9, whereby "sticking" between insert 9 and pin 8—which would impair operation of the throttle—is avoided.

If bearing pressure should now increase due to a greater load on the bearing 1, then the cross section of the throttle point 7 increases, and there is an increase in the flow of gas through the system (consisting of throttle 2 and bearing 1); this increase in flow opposes and offsets any load-induced reduction in bearing clearance S.

By adding the described throttle to a gas bearing, one comes very close to the theoretically calculated characteristic for a stabilized bearing. Further approximation to the ideal case can be obtained in the region of extremely high bearing load if the change in cross section of the throttle path does not change linearly with the pressure difference between the chambers 17 and 18. This result can be obtained, for instance, by a suitably characterized shaping of pin 9, whose cone angle should then vary in accordance with a calculated function over the length of the pin.

What is claimed is:

1. Throttle-valve means for maintaining constant bearing clearance in a gas bearing, said valve means comprising a valve body having inlet and outlet ports respectively communicating with inlet and outlet chambers, a rim-mounted displaceable circular diaphragm separating said chambers, and auxiliary body centrally carried by said diaphragm and having a conically tapered throttle passage therethrough for gas flow from the inlet chamber to the outlet chamber, the taper of said passage being divergent in the gas flow direction, and a conical throttle pin positioned within and in clearance with said passage and divergent in the gas-flow direction the pressure differential between the inlet and outlet chambers displacing said diaphragm to regulate the size of the throttle passage to control gas flow through said outlet port.

2. Throttle-valve means according to claim 1, in which said throttle pin is axially adjustably positioned.

3. Throttle-valve means according to claim 1, in which said auxiliary body is spring-loaded within said valve body and in the direction opposite to that of gas flow.

4. Throttle-valve means according to claim 3, in which the spring-loading of said auxiliary body is adjustable.

5. Throttle-valve means according to claim 3, in which the magnitude of spring-loading is selected to substantially offset diaphragm displacement attributable to the pressure drop across the throttle passage between said pin and said bore for a normal clearance (S) in a gas bearing served by said outlet port, whereby outlet pressure variations responsive to gas-bearing load deviations from the normal condition will be operative to effect diaphragm displacement within the axially central zone of diaphragm displaceability.

6. Throttle-valve means according to claim 1, wherein the throttle pin is mounted radially displaceably so that it is self-centering in the throttle passage.

7. Throttle-valve means according to claim 1, wherein the cone angle of the conical throttle pin varies over the length of the pin.

8. A gas bearing system comprising:
   a gas operated bearing disposed over a bearing surface;
   a source of pressurized gas;
   a gas supply line connecting said source of pressurized gas to said gas bearing; and
   throttle-valve means disposed in said supply line between said pressurized gas source and said bearing, said valve means having a valve body having inlet and outlet ports connected to said pressurized gas source and said gas operated bearing respectively and communicating with inlet and outlet chambers, a rim-mounted displaceable circular diaphragm separating said chambers, and auxiliary body centrally carried by said diaphragm and having a conically tapered throttle passage therethrough for gas flow from the inlet chamber to the outlet chamber, the taper of said passage being divergent in the gas flow direction, and a conical throttle pin positioned within and in clearance with said passage and divergent in the gas-flow direction the pressure differential between the inlet and outlet chambers displacing said diaphragm to regulate the size of the throttle passage to control gas flow through said outlet port to said bearing.

* * * * *